(12) United States Patent
Arnady et al.

(10) Patent No.: US 10,057,237 B2
(45) Date of Patent: Aug. 21, 2018

(54) PROVIDE INSENSITIVE SUMMARY FOR AN ENCRYPTED DOCUMENT

(71) Applicant: CA, Inc., New York, NY (US)

(72) Inventors: Shashanka Arnady, Bengaluru (IN); Chetan Doddamani, Bengaluru (IN); PrasannaBabu Krishnappa, Bengaluru (IN)

(73) Assignee: CA, Inc., New York, NY (US)

( * ) Notice: Subject to any disclaimer, the term of this patent is extended or adjusted under 35 U.S.C. 154(b) by 230 days.

(21) Appl. No.: 14/624,293

(22) Filed: Feb. 17, 2015

(65) Prior Publication Data

US 2016/0241546 A1 Aug. 18, 2016

(51) Int. Cl.
*H04L 9/32* (2006.01)
*H04L 29/06* (2006.01)
*H04L 9/06* (2006.01)

(52) U.S. Cl.
CPC ............ *H04L 63/0807* (2013.01); *H04L 9/06* (2013.01); *H04L 63/0428* (2013.01); *H04L 63/061* (2013.01); *H04L 63/0869* (2013.01); *H04L 2209/04* (2013.01)

(58) Field of Classification Search
USPC ........................................................ 713/172
See application file for complete search history.

(56) References Cited

U.S. PATENT DOCUMENTS

| 6,199,102 B1 * | 3/2001 | Cobb ...................... H04L 51/12 709/202 |
| 7,130,401 B2 * | 10/2006 | Rampey ................ H04M 15/06 379/142.05 |
| 7,877,807 B2 * | 1/2011 | Shipp .................... G06F 21/562 726/22 |

(Continued)

FOREIGN PATENT DOCUMENTS

CN          102098293 A          6/2011

OTHER PUBLICATIONS

English Abstract of Chinese Publication No. CN102098293 published on Jun. 15, 2011.

*Primary Examiner* — Amare F Tabor
(74) *Attorney, Agent, or Firm* — Vierra Magen Marcus LLP

(57) ABSTRACT

An insensitive summary of an encrypted electronic document, such as email, is provided. The insensitive summary provides a summary of the encrypted electronic document without providing sensitive information, such as passwords. The electronic document may be an email, text (such as in a word processing file), spreadsheet and/or presentation. Natural language processing methods, such as parts of speech (POS) tagging, word clustering, regular expression evaluating, sensitive key word searching and/or other methods, may be used to identify and mask sensitive words before summarization and encryption of the electronic document. A user's efficiency in operating a computing device may be increased having an associated insensitive summary (Continued)

without compromising security of the encrypted electronic document. A user may direct a computing device to perform a search (or similarly categorize or use rules) to identify the encrypted electronic document by searching for contents of the associated insensitive summary.

19 Claims, 9 Drawing Sheets

(56) References Cited

U.S. PATENT DOCUMENTS

| | | | | |
|---|---|---|---|---|
| 8,321,512 | B2 * | 11/2012 | McElligott | H04L 51/12 |
| | | | | 709/206 |
| 9,122,880 | B2 * | 9/2015 | Arya | G06F 21/60 |
| 2004/0054498 | A1 * | 3/2004 | Shipp | G06F 21/562 |
| | | | | 702/182 |
| 2007/0277238 | A1 * | 11/2007 | Margalit | G06F 21/562 |
| | | | | 726/22 |
| 2009/0089859 | A1 * | 4/2009 | Cook | H04L 12/585 |
| | | | | 726/3 |
| 2010/0036813 | A1 * | 2/2010 | Cameron | G06Q 10/107 |
| | | | | 707/726 |
| 2012/0245925 | A1 * | 9/2012 | Guha | G06F 17/27 |
| | | | | 704/9 |
| 2015/0067833 | A1 * | 3/2015 | Verma | H04L 63/1483 |
| | | | | 726/22 |

\* cited by examiner

POS Categories 300

| | |
|---|---|
| Coordinating conjunction | Possessive pronoun |
| Cardinal number | Adverb |
| Determiner | Adverb, comparative |
| Existential there | Adverb, superlative |
| Foreign word | Particle |
| Preposition or subordinating conjunction | Symbol |
| Adjective | to |
| Adjective, comparative | Interjection |
| Adjective, superlative | Verb, base form |
| List item marker | Verb, past tense |
| Modal | Verb, gerund or present participle |
| Noun, singular or mass | Verb, past participle |
| Noun, plural | Verb, non-3rd person singular present |
| Proper noun, singular | Verb, 3rd person singular present |
| Proper noun, plural | Wh-determiner |
| Predeterminer | Wh-pronoun |
| Possessive ending | Possessive wh-pronoun |
| Personal pronoun | Wh-adverb |

Table I

*FIG. 3A*

Token 350

| 351 | 352 | 353 |
|---|---|---|
| Lexical item (such as a word or phrase in content or text) | POS Catagory | Sensitivity |

*FIG. 3B*

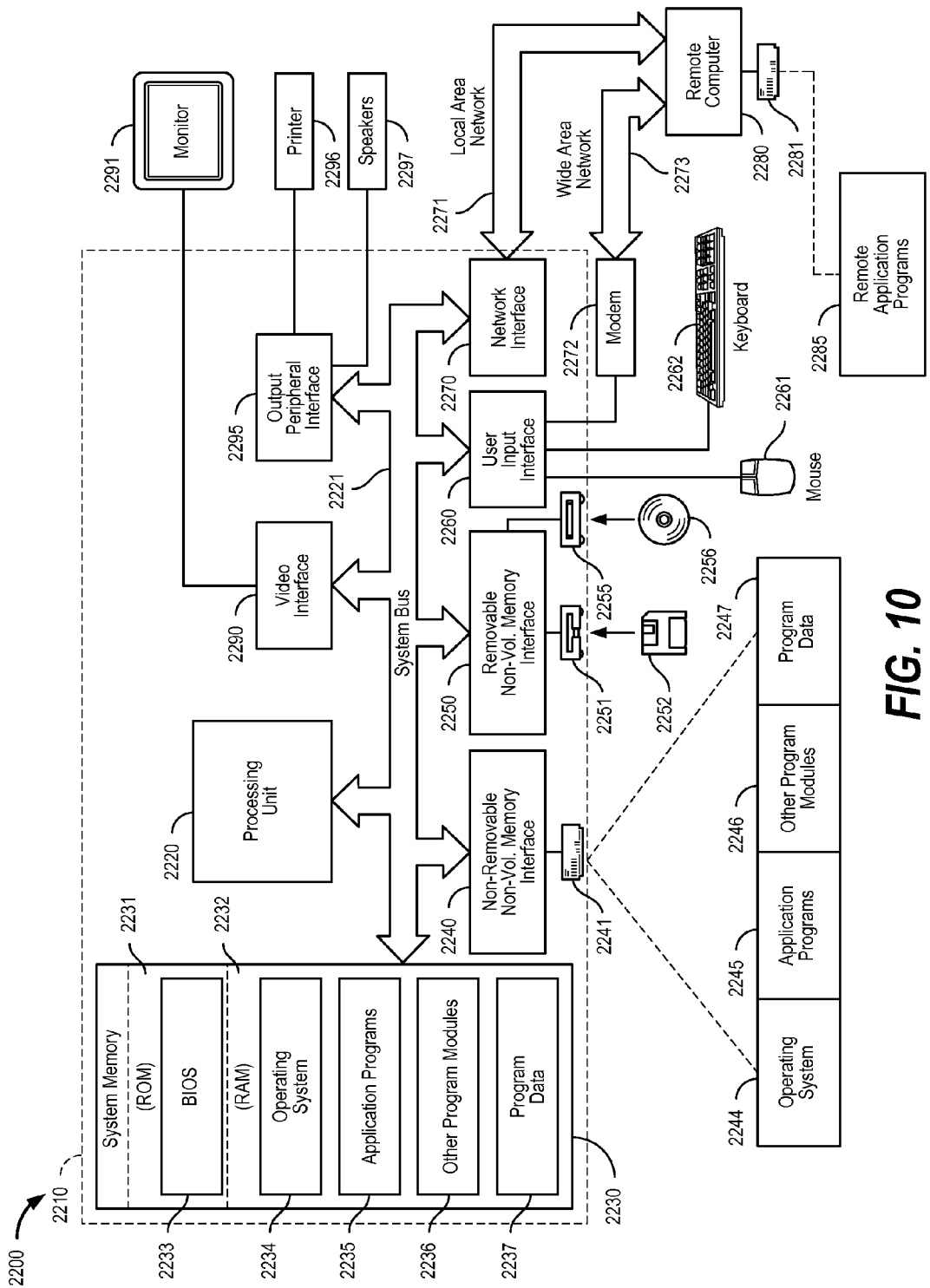

US 10,057,237 B2

PROVIDE INSENSITIVE SUMMARY FOR AN ENCRYPTED DOCUMENT

BACKGROUND

The present disclosure relates to communicating between computing devices, and in particular providing an insensitive summary for an encrypted electronic document.

Sensitive electronic documents may be encrypted and provided to a recipient. Encryption is a process of encoding messages or information in such a way that a recipient can read the information after decryption. Encryption does not typically prevent interception, but typically prevents access to the message information by an interceptor. A message may be encrypted by a sender and then decrypted by a recipient using an encryption key.

An encrypted electronic document may be in the form of an email and may be provided to the recipient electronically by way of a network of computing devices. After authentication, a recipient may then be able to decrypt the encrypted e-mail to view the sensitive contents. Typically, a recipient does not know the subject matter of the encrypted email until after the encrypted email is decrypted and read.

BRIEF SUMMARY

An insensitive summary of an encrypted electronic document, such as email, is provided. The insensitive summary provides a summary of the encrypted electronic document without providing sensitive information, such as passwords. The electronic document may be an email, text (such as in a word processing file), spreadsheet and/or presentation in embodiments. In embodiments, natural language processing methods, such as parts of speech (POS) tagging, word clustering, regular expression evaluating, sensitive key word searching, and/or other methods may be used to identify and mask sensitive words before summarization and encryption of the electronic document.

According to an aspect of the disclosure, a method comprises classifying, by a computing device, information of an electronic document with at least a linguistic category. The computing device identifies sensitive information in the electronic document based on the linguistic category. Sensitive information of the electronic document is masked based on the linguistic category to provide an electronic document having sensitive information that is masked. The computing device summarizes the electronic document having the sensitive information that is masked to provide an insensitive summary of the electronic document. The electronic document is encrypted and output with the insensitive summary.

According to another aspect of the disclosure, an apparatus comprises an integrated circuit processor and a computer readable storage medium to store computer program code. The computer program code configures the integrated circuit processor to: 1) convert text of an email into a plurality of tokens that represents a plurality of words, 2) tag a token in the plurality of tokens so that the token represents a part of speech category, 3) tag the token in the plurality of tokens so the token indicates a word represented by the token is sensitive, 4) mask the word in the text of the email in response to the token that indicates the word represented by the token is sensitive, 5) generate an insensitive summary of the text of the email with the word being masked, 6) encrypt the text of the email into an encrypted email and 7) output the insensitive summary and encrypted email.

According to another aspect of the disclosure, a computer program product comprises a computer readable storage medium having computer program code embodied therewith. The computer program code comprises: 1) computer program code configured to identify sensitive information in an email; 2) computer program code configured to mask the sensitive information in the email; 3) computer program code configured to provide an insensitive summary of the email that has sensitive information that is masked; 4) computer program code configured to encrypt the email into an encrypted email; and 5) computer program code configured to output the insensitive summary of the email and the encrypted email.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 3A illustrates a Table I of different types of parts of speech (POS) categories according to an embodiment.

FIG. 3B illustrates a token according to an embodiment.

FIG. 10 is a block diagram of a computing device environment according to an embodiment.

DETAILED DESCRIPTION

Figure 1:
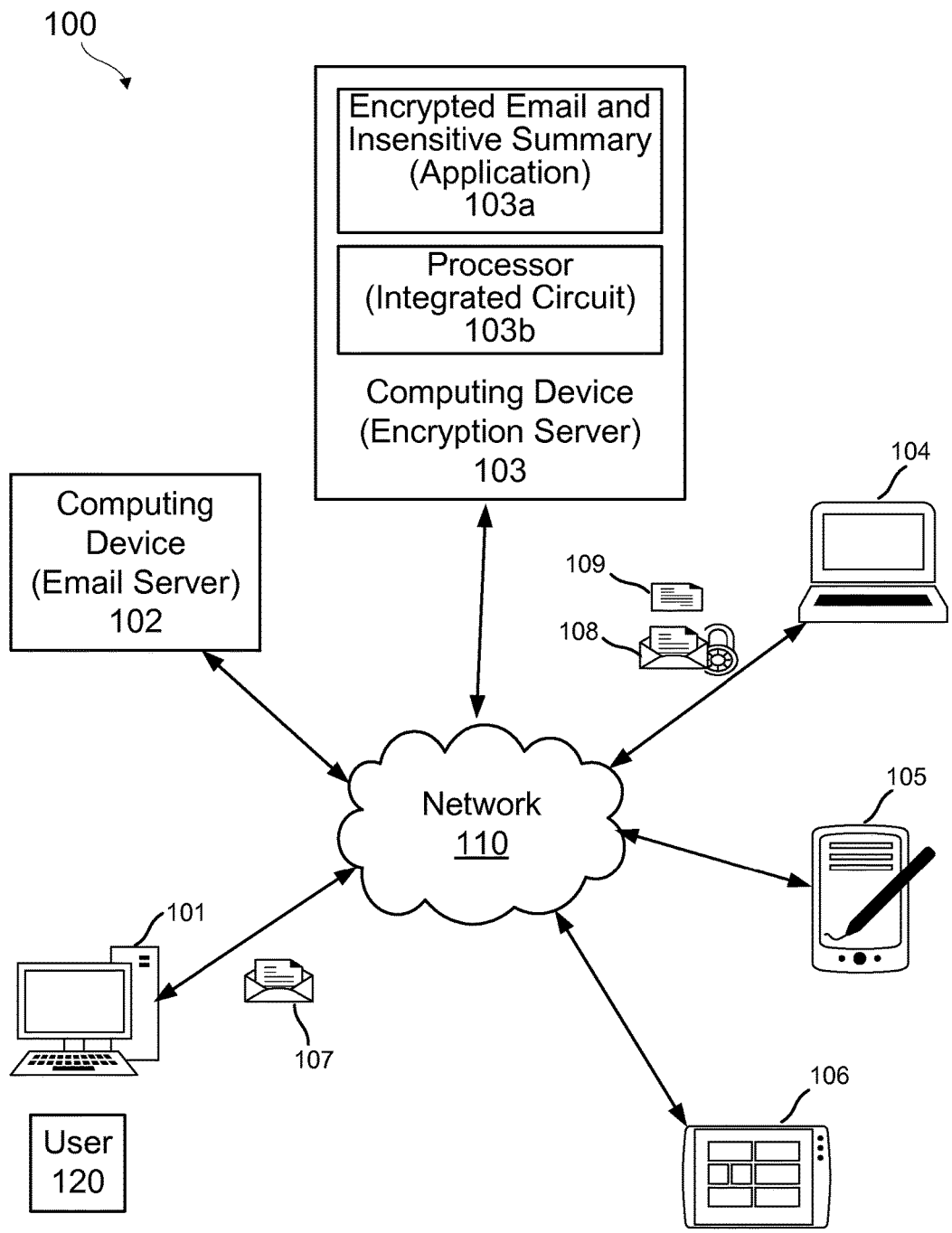
FIG. 1 illustrates a high-level block diagram of a system (or apparatus) comprising a computing device to provide an insensitive summary for an encrypted electronic document, such as an email, according to an embodiment.

An insensitive summary of an encrypted electronic document that contains sensitive information, such an encrypted email, is provided. The insensitive summary provides a summary of the encrypted electronic document without providing sensitive information, such as passwords. The electronic document may be an email, text (such as in a word processing file), spreadsheet and/or presentation in embodiments. The insensitive summary may be included in a preview of an email in an embodiment.

A user's efficiency and usability in operating a computing device may be increased having an associated insensitive summary without compromising security of the encrypted electronic document. A user may prioritize decrypting the encrypted email based on viewing the insensitive summary after the user is authenticated in an embodiment. A user may direct a computing device to perform a search to identify the encrypted electronic document by searching for contents of the associated insensitive summary. Categorization and rules set by a user in a computing device that may not operate with an encrypted electronic document may be used by having an associated insensitive summary.

In embodiments, insensitive summary technology may be included in a computing device, such as a server, having an integrated circuit processor executing (or reading) computer program code stored on a computer readable storage media, such as an integrated circuit memory. Natural language processing methods, such as parts of speech (POS) tagging, word clustering, regular expression evaluating, sensitive key word searching and/or other methods, may be used to identify and mask sensitive words before summarization and encryption of the electronic document.

In embodiments, actual sensitive information, or sensitive information values (characters), that may be buried in an electronic document is identified. In embodiments, they are large numbers of ways in which sensitive information may be represented. For example, an administrator or user may like to identify password values, in an electronic document, that will be eventually masked before summarization. The administrator or user may then assign the word "password" as a sensitive key word. In embodiments, insensitive summary technology described herein, is able to identify password values in the electronic document, such as "sd#$@xcv," and not just the use of the word "password." Similarly, sensitive information may include personal information (or values) that may also be represented in very large numbers of ways. For example, an email may include the text: "Joe Smith is diagnosed with prostate cancer." In embodiments, insensitive summary technology described herein, may identify "prostate cancer" as sensitive information in the email.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer program code embodied thereon.

Any combination of one or more computer readable media may be utilized. The computer readable media may be a computer readable signal medium or a computer readable storage medium. A computer readable storage medium may be, for example, but not limited to, an electronic (integrated circuit), magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated signal with computer program code embodied therein, for example, in baseband or as part of a carrier wave. Propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, Radio Frequency (RF), etc., or any suitable combination of the foregoing.

Computer (readable) program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer (or computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations, sequence diagrams and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Similarly, each arrow of a sequence diagram may likewise be implemented by computer program instructions. These computer program instructions may be provided to a processor of a general purpose computer (or computing device), special purpose computer, or other programmable data processing apparatus to produce a machine, such that the instructions, which execute via the processor of the computer or other programmable instruction execution apparatus, create a mechanism for implementing the functions/acts specified in the flowchart, sequence diagram and/or block diagram block or blocks.

These computer program instructions may also be stored in a computer readable storage medium that when executed can direct a computing device (or processor), other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a high-level block diagram of an apparatus (or system) 100 comprising networked computing devices. In an embodiment, a system 100 includes a plurality of computing devices 101-106 coupled to a network 110. In embodiments, computing device 101 is a desktop computing device, computing device 104 is a laptop computing device, computing device 105 is a cellular telephone (or smartphone) and computing device 106 is a tablet computing device. In other embodiments, more or fewer types of computing devices may be used. In embodiments, computing devices 101-106, singly or in combination, may be a desktop, netbook, laptop, tablet, personal digital assistant, mobile telephone and/or similar device. In other embodiments, computing devices may include wearable computers, embedded system, mainframe and/or other computing devices having processors executing or reading computer programmable code. In embodiment, one or more computing devices illustrated in FIG. 1 include one or more processors to read and/or execute computer program code stored on a computer readable storage medium.

In embodiments, each computing device illustrated in FIG. 1 includes at least an integrated circuit processor executing (or reading) computer (readable) program code stored on a computer readable storage media, such as an integrated circuit memory. In particular, computing device 103, embodied as an encryption server, includes integrated circuit processor 103*b* and encrypted email and insensitive summary (application) 103*a*, embodied as computer program code, as described herein. In embodiments, computing devices illustrated in FIG. 1 may include browsers and/or email computer program code to compose, read, preview, send, receive and/or decrypt emails and insensitive summaries of the encrypted emails.

As illustrated in FIG. 1, user 120 may use a computing device 101 to prepare and send an electronic document, such as an email 107, to other computing devices. Computing device 101 may send an email 107 to one or more of computing devices 104-106 via network 110, such as computing device 104. In an embodiment, email 107 may be sent to computing device 104 via computing device 102, embodied as an email server, and computing device 103, embodied as an encryption server.

In an embodiment, computing device 102 sends email 107 to computing device 103 when a determination is made that email 107 includes sensitive information that should be encrypted and an insensitive summary should be provided. In an embodiment, computing device 102 makes that determination based on a predetermined rule (or computer program code) and/or administrator action. For example, email addressed to particular recipients or from particular senders may be forwarded to computing device 103 as a sensitive email. Similarly, emails from particular domains may be forwarded to computing device 103 in an embodiment.

In an embodiment, computing device 103 provides an insensitive summary 109 of email 107 and encrypted email 108 of email 107 to computing device 104 (or forwards to computing device 102 that then sends encrypted email 108 and insensitive summary 109 to computing device 104) as described herein. In embodiments, computing devices 102 and 103 may be included in a single computing device or distributed in more computing devices.

In embodiments, computing devices illustrated in FIG. 1 have user interfaces to access the respective computing devices. In embodiments, a user interface includes computer program code as well as hardware components. A user interface may include input devices such as a touchscreen, microphone, camera, keyboard, mouse, pointing device and/or position sensors. Similarly, a user interface may include output devices, such as a display, vibrator and/or speaker, to output images, characters, vibrations, speech and/or video as an output. A user interface may also include a natural user interface where a user 120 may speak, touch or gesture to a user interface to provide input.

In embodiments, one or more computing device illustrated in FIG. 1 may act as a server while one or more computing devices may act as a client. In an embodiment, one or more computing devices may act as peers in a peer-to-peer (P2P) relationship.

Computing devices illustrated in FIG. 1 communicate or transfer information by way of network 110. In an embodiment, network 110 may be the Internet, a WAN or a LAN, singly or in combination. In an embodiment, computing devices illustrated in FIG. 1 use one or more protocols to transfer information, such as Transmission Control Protocol/Internet Protocol (TCP/IP). In embodiments, computing devices illustrated in FIG. 1 include input/output (I/O) computer program code as well as hardware components, such as I/O circuits to receive and output information from and to other computing devices, via network 110. In an embodiment, an I/O circuit may include a transmitter and receiver circuit.

Figure 2:
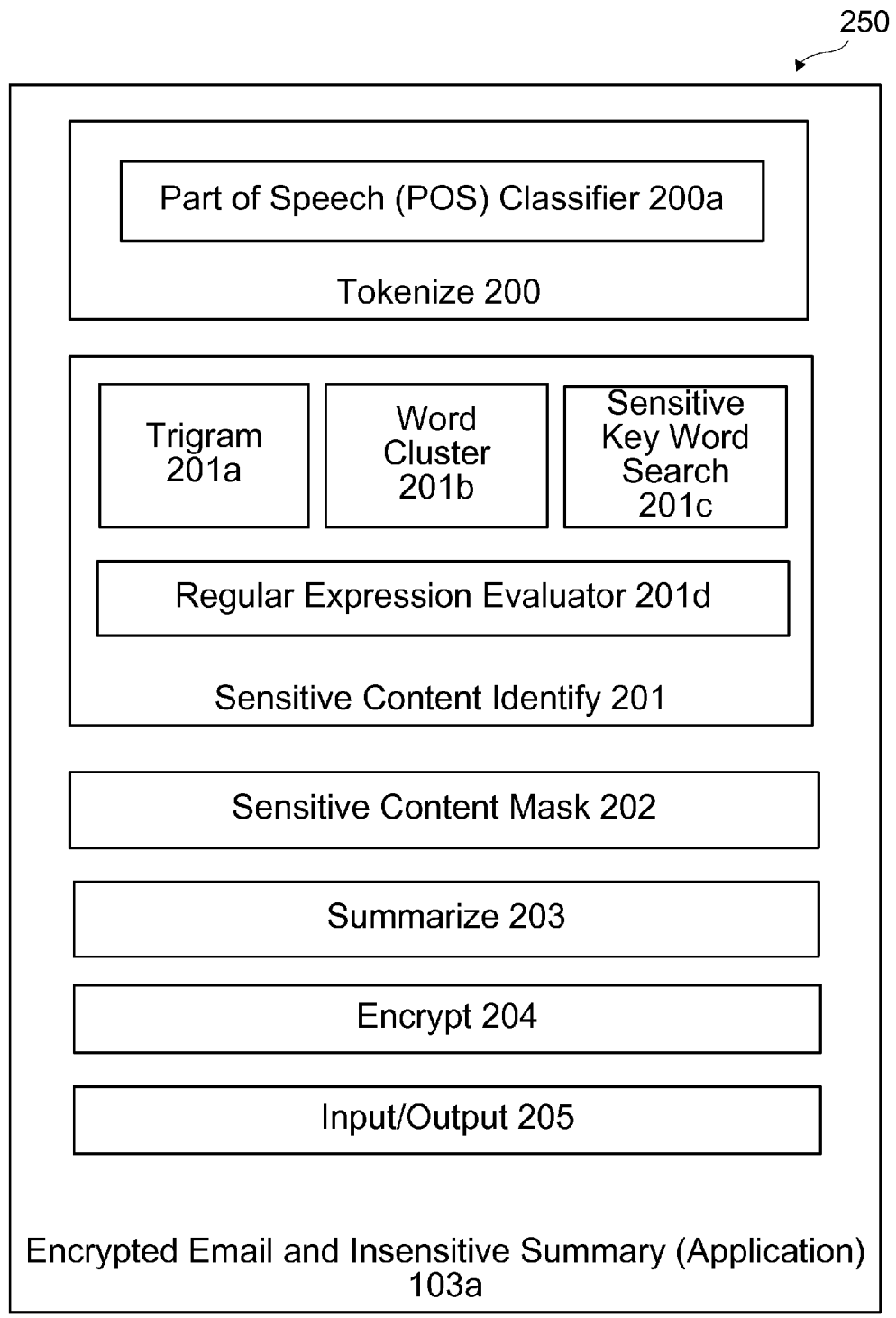
FIG. 2 illustrates a software architecture to provide insensitive summary for an electronic document according to an embodiment.

FIG. 2 illustrates a software architecture 250 for system 100 shown in FIG. 1 according to embodiments. In an embodiment, FIG. 2 illustrates the software architecture of encrypted email and insensitive summary (application) 103*a* shown in FIG. 1. Software architecture 250 illustrates computer program code or instructions (or portions thereof) to provide insensitive summary technology described herein. In embodiments, one or more processors execute (or read) computer (or processor) program code to provide at least portions of an insensitive summary technology that provides an insensitive summary and encrypted electronic document, such as an email.

In embodiments, computer program code illustrated in FIG. 2 may be embodied as a software program, software object, software function, software subroutine, software method, software instance, script and/or a code fragment, singly or in combination. In order to clearly describe the technology, computer program code shown in FIG. 2 is described as individual software component or components. In embodiments, the software components illustrated in FIG. 2, singly or in combination, may be stored (in computer readable storage medium(s)) and/or executed by a single or distributed computing device (processor) architecture. As one of ordinary skill in the art would understand, the functions performed by the various software components described herein are exemplary. In other embodiments, software components identified herein may perform more or less functions.

In embodiments, encrypted email and insensitive summary (application) 103*a* includes tokenize 200, sensitive content identify 201, sensitive content mask 202, summarize 203, encrypt 204 and input/output (I/O) 205 software components.

Tokenize 200, in an embodiment, is responsible for partitioning an electronic document into components, such as lexical items in content or text. In an embodiment, tokenize 200 partitions content of an email into a plurality of tokens. In an embodiment, tokenize 200 forms a plurality of tokens that represent lexical items, such as words, phrases, letters or groups of words, in content or text. In an embodiment, a list of words or tokens are formed. In an embodiment, a token may include other information that identifies the corresponding lexical item as having a particular POS category, being sensitive and/or being masked as described herein. In an embodiment, a token is illustrated in FIG. 3B and described herein.

In an embodiment, tokenize 200 includes a POS classifier 200a. In an embodiment, a token corresponding to a particular lexical item and also includes a portion of information or field that identifies a particular lexical item belongs to a particular POS category. In an embodiment, a field of a token or a portion of a token may be tagged or marked by a code to indicate that the corresponding lexical item is included (or classified) in a particular POS category by POS classifier 200a. FIG. 3A illustrates a Table I of POS categories 300. For example, a particular lexical item may have a corresponding (or classified) POS category such as a "cardinal number," "adverb," "determiner" . . . as illustrated in Table I. In an embodiment, tokenize 200 provides a list of words (lexical items) or corresponding tokens representing the text or contents of the electronic document to sensitive content identify 201.

Sensitive content identify 201, in an embodiment, is responsible for identifying (such as tagging or marking) sensitive content in an electronic document, such as a password in an email. In an embodiment, a token corresponding to a particular lexical item also includes a portion of information or field that identifies whether the lexical element is sensitive. In an embodiment, a field of a token or a portion of a token may be tagged or marked with a code to indicate that the corresponding lexical item is sensitive. In an embodiment, sensitive content identify 201 receives a plurality of tokens or a list of words representing text or content of an electronic document from tokenize 200.

In an embodiment, sensitive content identify 201 includes trigram 201a that is responsible for, among other functions, forming trigrams of content. Trigrams are a special case of the n-gram, where n is 3. An n-gram of size 1 is referred to as a "unigram;" size 2 is a "bigram" (or, less commonly, a "digram"); size 3 is a "trigram." Larger sizes are sometimes referred to by the value of n, e.g., "four-gram," "five-gram," and so on.

In an embodiment, trigrams are used for statistical analysis of text or content of an electronic document. In an embodiment, an n-gram is a contiguous sequence of n items from a given sequence of text or content. The items can be phonemes, syllables, letters, words or base pairs according to an embodiment.

In an embodiment, sensitive content identify 201 includes a word cluster 201b that is responsible for clustering words in content of an electronic document. In an embodiment, word cluster 201b is a Brown word cluster method which may be used in natural language processing. In an embodiment, word cluster 201b forms a hierarchical cluster of words based on the contexts in which they occur. In an embodiment, word cluster 201b uses a class-based language model where probabilities of words are based on the classes (clusters) of previous words. For example, word cluster 201b may cluster or group the days of the week found in text together: "Monday," "Tuesday," "Wednesday," "Thursday," "Friday," "Saturday," and "Sunday." In an embodiment, word clusters or group of words identified by word cluster 201b may be tagged as sensitive.

In an embodiment, sensitive content identify 201 includes sensitive key word search 201c that is responsible for identifying sensitive information in text or content by comparing words in the text with sensitive key words in a plurality of stored sensitive key words in sensitive key word search 210b. For example, sensitive key words may include social security number or "social," "security" and "number." When a match occurs between a sensitive key word and a particular word in text, the particular word in the text may be tagged as sensitive. In an embodiment, sensitive key words may include blacklisted words or words in a plurality of sensitive key words that are identified as to not be included in an insensitive summary.

In an embodiment, sensitive content identify 201 includes a regular expression evaluator 201d to identify a predetermined pattern in content or text in an electronic document that may be tagged as sensitive. In an embodiment, a regular expression evaluator 201d searches for a predetermined pattern in text or content. In an embodiment, regular expression evaluator 201d searches for a string of characters in a particular format or sequence. For example, regular expression evaluator 201d may search for sequence of characters ("x") matching: "(xxx) xxx-xxxx" that may match a pattern of telephone number; "xxx-xx-xxxx" that may match a pattern of a United States of America social security number; or a particular sequence of characters that matches a particular countries passport number format.

Sensitive content mask 202, in an embodiment, is responsible for masking sensitive information, such as sensitive information identified by sensitive content identify 201, in an electronic document. In an embodiment, sensitive content mask 202 replaces each character of a lexical item in a text that has been identified or marked (tagged) as sensitive with a mask character, such as a dark rectangle. In an embodiment, sensitive content mask 202 redacts information that is identified as sensitive information from text or content of an electronic document. In an embodiment, sensitive content mask 202 receives a plurality of tokens or a list of words representing text or content in an electronic document that have been tagged as sensitive or not from sensitive content identify 201.

Summarize 203, in an embodiment, is responsible for generating an insensitive summary of an electronic document, such as an email, that has had sensitive information masked in the content or text. In an embodiment, summarize 203 receives an electronic document that has been masked of sensitive information from sensitive content mask 202.

Encrypt 204 is responsible for encrypting an electronic document, such as email. In an embodiment, encrypt 204 encrypts an email that has not been masked to provide an encrypted email to input/output 205.

Input/output 205, in an embodiment, is responsible for outputting and receiving information, such as electronic documents, encrypted electronic documents and insensitive summaries, to and from other networked computing devices, such as computing devices 101-106. In embodiments, input/output 205 receives an encrypted email from encrypt 204 and an insensitive summary from summarize 203 and outputs both to another computing device for eventual view by an intended recipient.

FIG. 3A illustrates a Table I of different types of parts of speech (POS) categories according to an embodiment. A part of speech category is a category of words (or, more generally, of lexical items) which have similar grammatical properties. Words that are assigned to the same part of speech generally display similar behavior in terms of syntax—they play similar roles within the grammatical structure of sentences—and sometimes in terms of morphology, in that they undergo inflection for similar properties. In an embodiment, English parts of speech are noun, verb, adjective, adverb, pronoun, preposition, conjunction, and interjection.

In an embodiment, a lexical item in an electronic document, such as an email, may be categorized or classified by using the linguistic categories in Table I. For example, a lexical item, such as a word in an email, may be classified or categorized as "verb, base form" or "Noun, plural" as illustrated in Table I. In embodiments, a lexical item (or lexical unit, lexical entry) is a single word, a part of a word, or a chain of words that forms the basic elements of a language's lexicon (such as vocabulary). Examples of lexical items include cat, traffic light, take care of, by the way, and it's raining cats and dogs. In an embodiment, lexical items can be generally understood to convey a single meaning, such as a lexeme, but are not limited to single words.

FIG. 3B illustrates a token according to an embodiment. In an embodiment, at token 350 includes information regarding a lexical item in an electronic document that may be stored in a computer readable storage medium, such as an integrated circuit memory. In an embodiment, a token 350 may be a data structure that includes information regarding a lexical item in an electronic document. An integrated circuit processor executing computer program code may write to or read from (as well as create) a token 350 (or portions thereof).

Token 350 may include a data structure having a record with one or more fields (contiguous or noncontiguous) to store related portions of information in a computer readable storage medium that is accessible (written to and/or read from) by an integrated circuit processor. For example, digital information (or a first portion of information) or a code that represents a lexical item may be stored in field 351. Digital information (or a second portion of information) or a code that represents a POS category of the lexical item represented in field 351 may be stored in field 352. Digital information (or a third portion of information) or a code that represents whether the lexical item represented in field 351 is sensitive (or should not be included in an insensitive summary) may be stored in field 353. In an embodiment, a lexical item may be tagged, identified or marked by writing a code or digital information, by an integrated circuit processor, to associated fields 352 and 353 stored in a computer readable storage medium. A particular POS category or sensitivity of a particular lexical item may be identified by reading a stored code or digital information, by an integrated circuit processor, from associated fields 352 and 353.

Figure 4A:
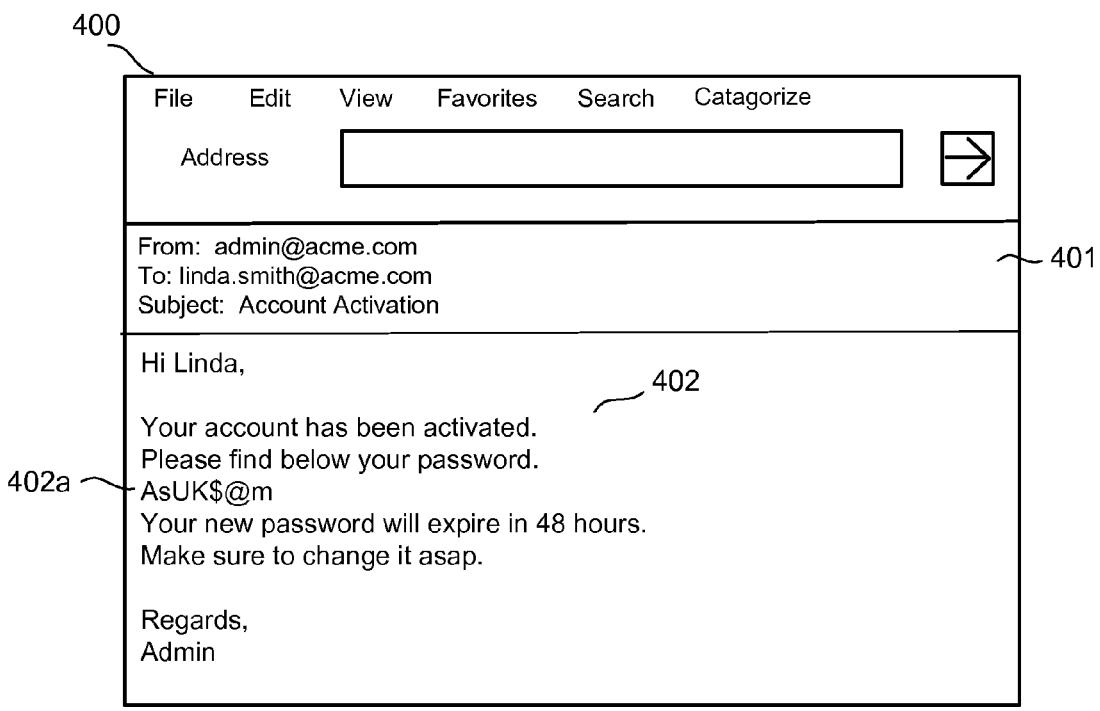
FIG. 4A illustrate a user interface that displays an electronic document, such as content of an email, according to an embodiment.

FIG. 4A illustrates a user interface 400 that displays an electronic document, such as an email. In an embodiment, user interface 400 is a user interface of an email application program that at least composes, sends, receives, previews and/or displays emails (among other functions in embodiments), such as email 401. In an embodiment, one or more email application programs are stored on computer readable media and executed by one or more processors in one or more computing devices 101-106 illustrated in FIG. 1. In an embodiment, user interface 400 displays content (or text) 402 including sensitive information 402a, such as a password, of an email 401 according to an embodiment. In an embodiment, email 401 corresponds to email 107 shown in FIG. 1. In an embodiment, email 401 is "From" "admin@acme.com" and "To" "linda.smith@acme.com" regarding ("Subject") "Account Activation." The content 402 includes sensitive information 402a, such as password "AsUK$@m" that should be provided to Linda Smith in a secure manner, or encrypted, in an embodiment.

Figure 4B:
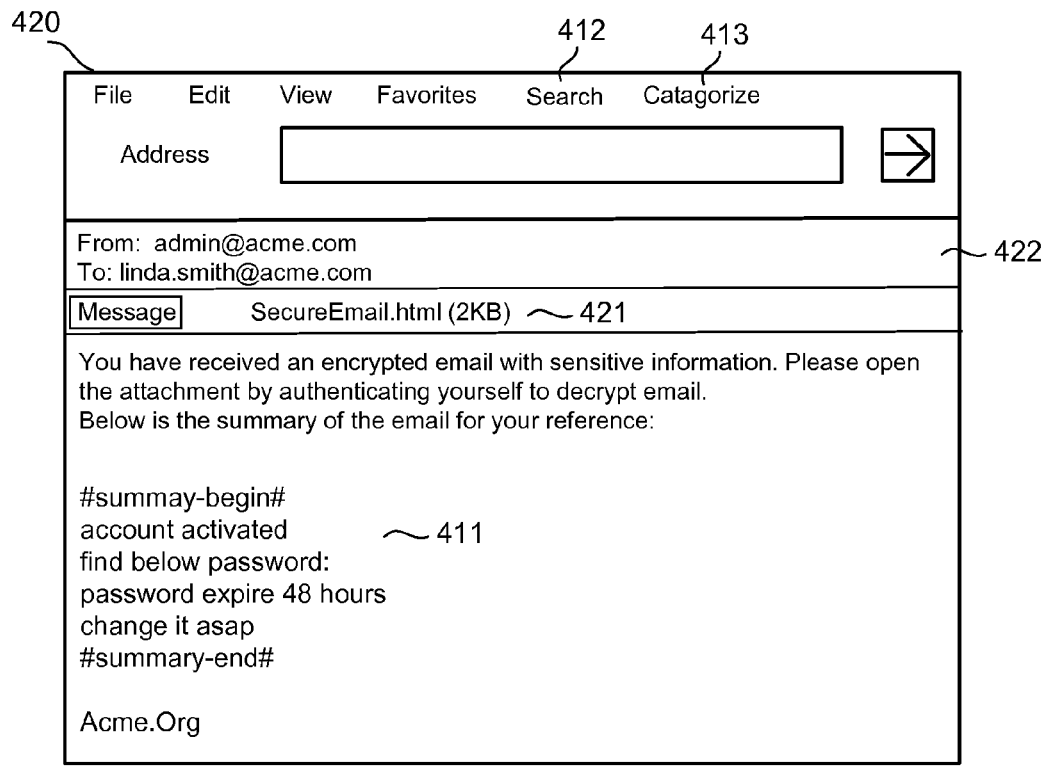
FIG. 4B illustrates an encrypted email and an insensitive summary of the encrypted email according to an embodiment.

FIG. 4B illustrates an encrypted email and an insensitive summary of the encrypted email according to an embodiment. In an embodiment, user interface 420 is a user interface of an email application program that at least composes, sends, receives, previews and displays emails (among other functions in embodiments). User interface 420 displays an email 422 having an attachment "SecureEmail.html" that is an encrypted email 421 of email 401 (or the content 402) shown in FIG. 4A. A user may decrypt encrypted email 421 with the appropriate decryption key after being authenticated. In an embodiment, user interface 420 includes an insensitive summary 411 of encrypted email 421. In an embodiment, insensitive summary 411 does not include sensitive information 402a, such as a password, of email 401. In an embodiment, encrypted email 421 and insensitive summary 411 corresponds to encrypted email 108 and insensitive summary 109 shown in FIG. 1

In embodiments, an insensitive summary 411 enables a user to prioritize decrypting and reading encrypted email 421. Further, insensitive summary 411 may increase a user's efficiency and usability in operating a computing device (in particular an email application program) by enabling email 422 (that attaches encrypted email 421) to be searched for and/or categorized. In embodiments, email 422 may be categorized by an email application program as illustrated by "Categorize" button 413 and similarly may be searched for as illustrated by "Search" button 412.

Figure 5:
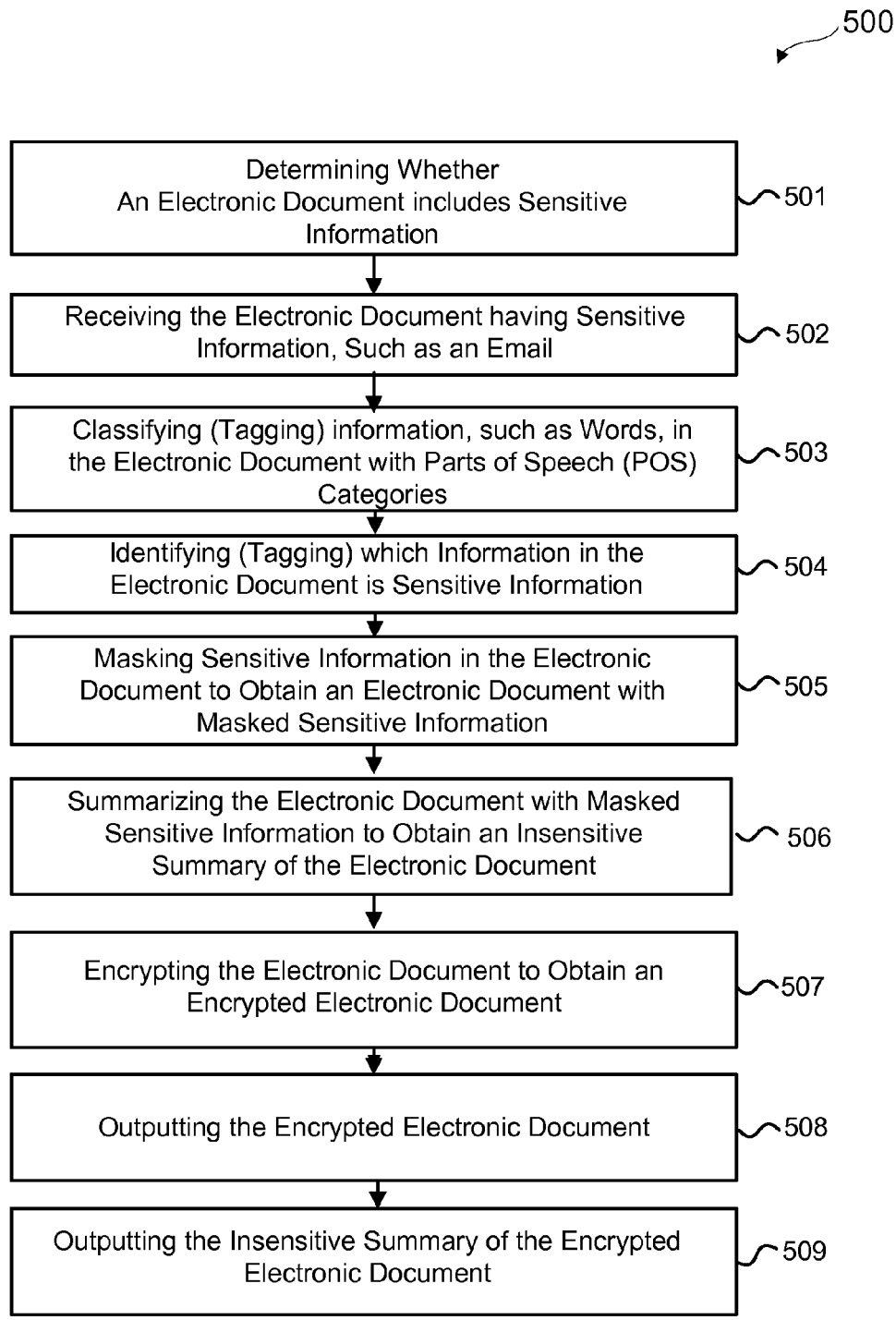
FIGS. 5, 6, 7A-C, 8 and 9 illustrate flowcharts of methods to provide an insensitive summary for encrypted electronic document according to an embodiments.

FIGS. 5, 6, 7A-C, 8 and 9 illustrate flowcharts of methods to provide an insensitive summary for an encrypted electronic document according to an embodiments. In particular, FIG. 5 illustrate a method 500 to output an insensitive summary for an encrypted electronic document, such an email, and an encrypted document, such as an encrypted email according to an embodiment. In an embodiment, computing device 103 execute computer program code (or processor readable instructions), such as one or more software components shown in FIG. 2, to perform at least portions of method 500.

Logic block 501 represents determining whether an electronic document includes sensitive information. In an embodiment, computing device 102, such as an email server, makes such a determination and forwards electronic documents having sensitive information to computing device 103. In an alternate embodiment, computing device 103 makes that determination.

Logic block 502 represents receiving the electronic document having sensitive information, such as an email. In an embodiment, computing device 103 executing computer program code, such as input/output 205 shown in FIG. 2, performs at least a portion of this function.

Logic block 503 represents classifying (tagging) information, such as words, in the electronic document with parts of speech (POS) categories. In an embodiment, computing device 103 executing computer program code, such as tokenize 200 shown in FIG. 2, performs at least a portion of this function. In an embodiment, computing device 103 executing computer program code, such as POS classifier 200a shown in FIG. 2, performs at least a portion of this function. In an embodiment, logic block 503 is performed by method 600 illustrated in FIG. 6. In an embodiment, logic block 503 is performed by logic block 504 described herein.

Logic block 504 represents identifying (tagging) which information in the electronic document is sensitive information. In an embodiment, computing device 103 executing computer program code, such as sensitive content identify 201 shown in FIG. 2, performs at least a portion of this function. In an embodiment, logic block 504 is performed by method 700 illustrated in FIG. 7.

Logic block 505 represents masking sensitive information in the electronic document to obtain an electronic document with masked sensitive information. In an embodiment, computing device 103 executing computer program code, such as sensitive content mask 202 shown in FIG. 2, performs at least a portion of this function. In an embodiment, logic block 505 is performed by method 800 illustrated in FIG. 8.

Logic block 506 represents summarizing the electronic document with masked sensitive information to obtain an insensitive summary of the electronic document. In an embodiment, an insensitive summary corresponds to insensitive summary 109 illustrated in FIG. 1. In an embodiment, computing device 103 executing computer program code, such as summarize 203 shown in FIG. 2, performs at least a portion of this function. In an embodiment, logic block 506 is performed by method 900 illustrated in FIG. 9.

Logic block 507 represents encrypting the electronic document to obtain an encrypted electronic document. In an embodiment, an encrypted document corresponds to encrypted email 108 illustrated in FIG. 1. In an embodiment, computing device 103 executing computer program code, such as encrypt 204 shown in FIG. 2, performs at least a portion of this function.

Logic block 508 represents outputting the encrypted electronic document. In an embodiment, computing device 103 executing computer program code, such as input/output 205 shown in FIG. 2, performs at least a portion of this function. In an embodiment, an encrypted electronic document is output to computing device 102, embodied as an email server that forwards the encrypted document, such as encrypted email 108, to a recipient, such as computing device 104. In an alternate embodiment, an encrypted document is output directly to the recipient.

Logic block 509 represents outputting the insensitive summary of the encrypted electronic document. In an embodiment, computing device 103 executing computer program code, such as input/output 205 shown in FIG. 2, performs at least a portion of this function. In an embodiment, an insensitive summary of the encrypted electronic document is output to computing device 102, embodied as an email server that forwards the encrypted document, such as insensitive summary 109, to a recipient, such as computing device 104. In an alternate embodiment, an insensitive summary is output directly to the recipient.

Figure 6:
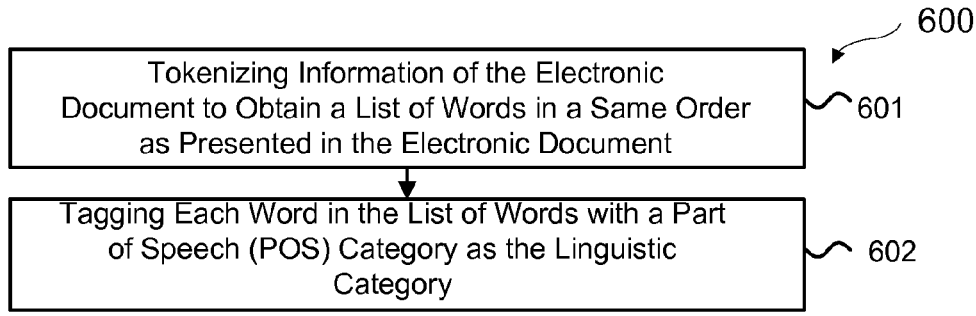

FIG. 6 is a flowchart illustrating a method 600 to POS tag lexical elements, such as words, in an electronic document according to an embodiment.

Logic block 601 illustrates tokenizing information of the electronic document to obtain a list of words in a same order as presented in the electronic document. In an embodiment, computing device 103 executing computer program code, such as tokenize 200 shown in FIG. 2, performs at least a portion of this function.

Figure 7A:
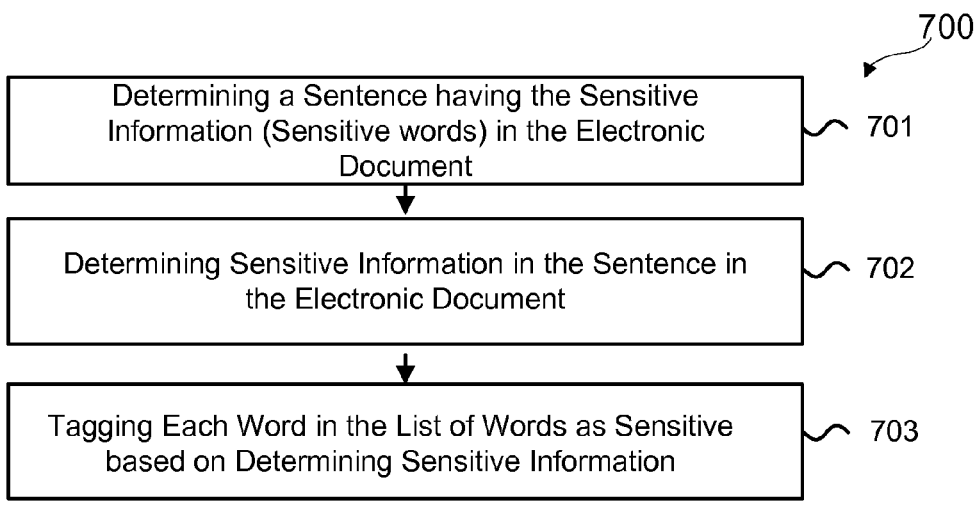

FIG. 7A is a flowchart illustrating a method 700 to identify (mark) with information in the electronic document is sensitive according to an embodiment.

Logic block 701 illustrates determining a sentence having sensitive information (sensitive lexical items, such as sensitive words) in the electronic document. In an embodiment, logic block 701 determines whether neighboring sentences to a sentence having sensitive information have other sensitive information. In an embodiment, computing device 103 executing computer program code, such as sensitive content identify 201 shown in FIG. 2, performs at least a portion of this function. In an embodiment, method 710 illustrated in FIG. 7B performs at least a portion of the function of logic block 701.

Logic block 702 illustrates determining sensitive information in the sentence as identified as a sensitive sentence in the electronic document. In an embodiment, logic block 702 determines sensitive information in neighboring sentences that have been identified as having sensitive information. In an embodiment, computing device 103 executing computer program code, such as sensitive content identify 201 shown in FIG. 2, performs at least a portion of this function. In an embodiment, method 720 illustrated in FIG. 7C performs at least a portion of the function of logic block 702.

Logic block 703 illustrates tagging each word (or associated token) in the list of words as sensitive based on determining sensitive information. In an embodiment, computing device 103 executing computer program code, such as sensitive content identify 201 shown in FIG. 2, performs at least a portion of this function.

Figure 7B:
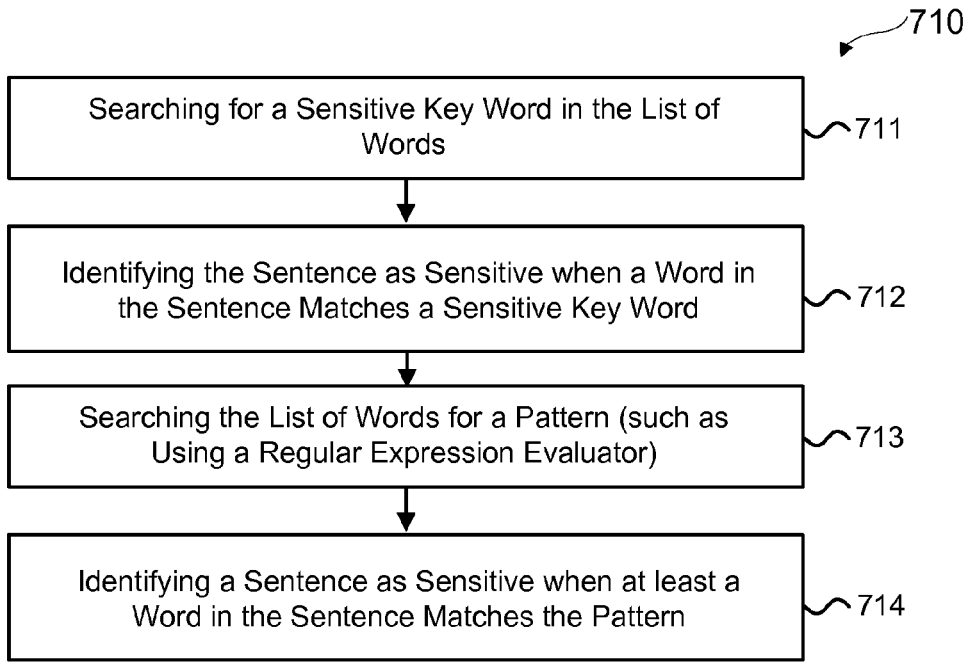

FIG. 7B is a flowchart illustrating a method 710 to determining a sentence having sensitive information (sensitive lexical items, such as sensitive words) in the electronic document.

Logic block 711 illustrates searching for a sensitive key word in the list of words. In an embodiment, computing device 103 executing computer program code, such as sensitive content identify 201 (in particular sensitive key word search 201c) shown in FIG. 2, performs at least a portion of this function.

Logic block 712 illustrates identifying the sentence as sensitive when a word in the sentence matches a sensitive key word. In an embodiment, computing device 103 executing computer program code, such as sensitive content identify 201 (in particular sensitive key word search 201c) shown in FIG. 2, performs at least a portion of this function.

Logic block 713 illustrates searching the list of words for a pattern (such as using a regular expression evaluator). In an embodiment, computing device 103 executing computer program code, such as sensitive content identify 201 (in particular regular expression evaluator 201d) shown in FIG. 2, performs at least a portion of this function.

Logic block 714 illustrates identifying a sentence as sensitive when at least a word in the sentence matches the pattern. In an embodiment, computing device 103 executing computer program code, such as sensitive content identify 201 (in particular regular expression evaluator 201d) shown in FIG. 2, performs at least a portion of this function.

Figure 7C:
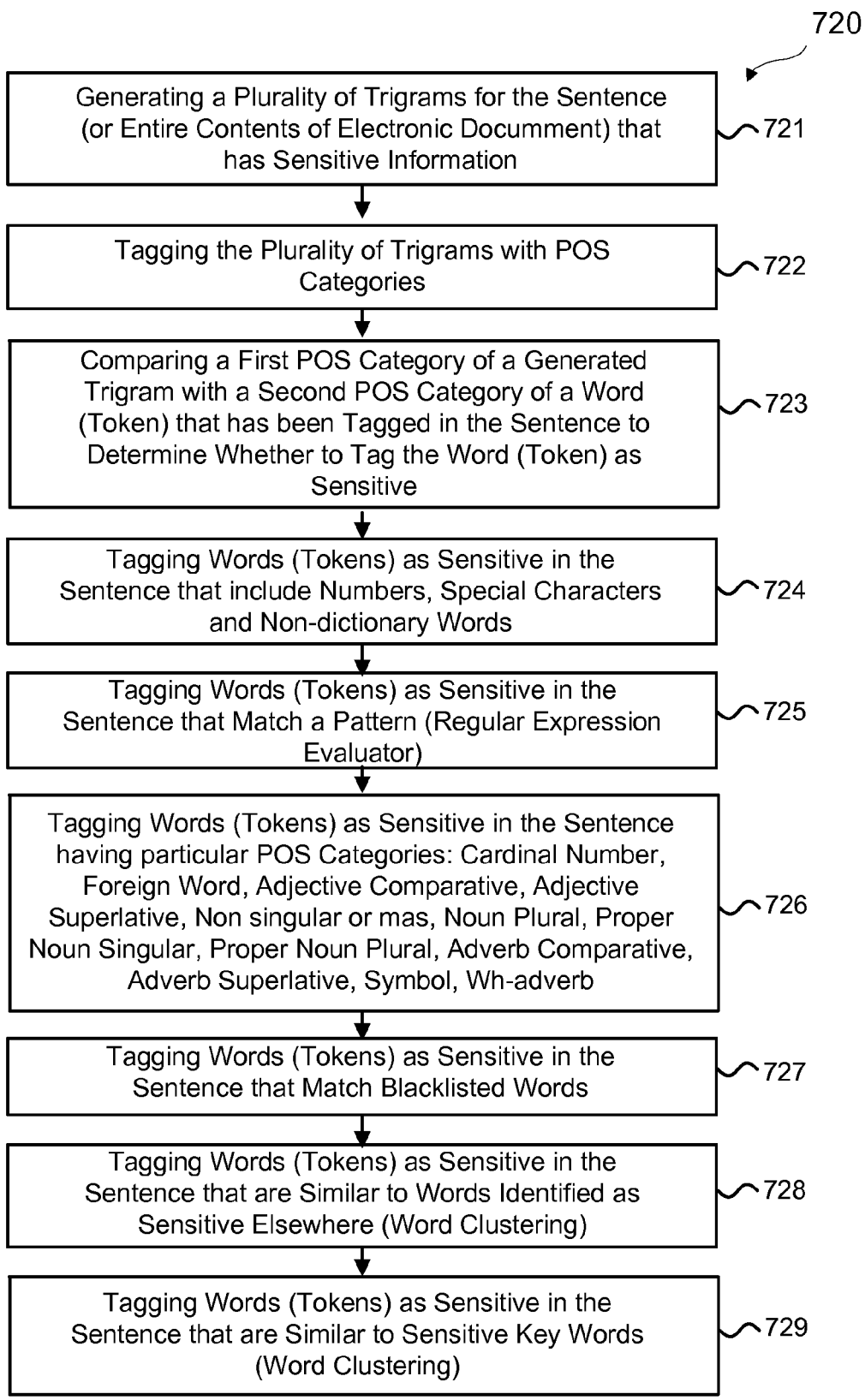

FIG. 7C is a flowchart illustrating a method 720 to determine sensitive information in sentences that have sensitive information.

Logic block 721 illustrates generating a plurality of trigrams for the sentence that has sensitive information. In another embodiment, a plurality of trigrams are generated for the entire contents of the electronic document. In an embodiment, computing device 103 executing computer program code, such as sensitive content identify 201 (in particular trigram 201a) shown in FIG. 2, performs at least a portion of this function.

Logic block 722 illustrates tagging the plurality of trigrams with POS categories. In an embodiment, computing device 103 executing computer program code, such as sensitive content identify 201 (in particular trigram 201a) shown in FIG. 2, performs at least a portion of this function.

Logic block 723 illustrates comparing a first POS category of a generated trigram with a second POS category of a word (token) that has been tagged in the sentence to determine whether to tag the word (token) as sensitive. In an embodiment, computing device 103 executing computer program code, such as sensitive content identify 201 (in particular trigram 201*a*) shown in FIG. 2, performs at least a portion of this function.

Logic block 724 illustrates tagging words (tokens) as sensitive in the sentence that include numbers, special characters and non-dictionary words. In an embodiment, computing device 103 executing computer program code, such as sensitive content identify 201 shown in FIG. 2, performs at least a portion of this function.

Logic block 725 illustrates tagging words (tokens) as sensitive in the sentence that match a pattern (expression evaluator). In an embodiment, computing device 103 executing computer program code, such as sensitive content identify 201 (in particular regular expression pattern evaluator) shown in FIG. 2, performs at least a portion of this function.

Logic block 726 illustrates tagging words (tokens) as sensitive in the sentence having particular POS categories. In an embodiment, the POS categories include Cardinal Number, Foreign Word, Adjective Comparative, Adjective Superlative, Nonsingular or mas, Noun Plural, Proper Noun Singular, Proper Noun Plural, Adverb Comparative, Adverb Superlative, Symbol, Wh-adverb. In an embodiment, computing device 103 executing computer program code, such as sensitive content identify 201 shown in FIG. 2, performs at least a portion of this function.

Logic block 727 illustrates tagging words (tokens) as sensitive in the sentence that match blacklisted words. Blacklisted words are words in a list or plurality of words that are not included in an insensitive summary. In an embodiment, computing device 103 executing computer program code, such as sensitive content identify 201 shown in FIG. 2, performs at least a portion of this function.

Logic block 728 illustrates tagging words (tokens) as sensitive in the sentence that are similar to words identified as sensitive elsewhere (word clustering). In an embodiment, computing device 103 executing computer program code, such as sensitive content identify 201 (in particular word cluster 201*b*) shown in FIG. 2, performs at least a portion of this function.

Logic block 729 illustrates tagging words (tokens) as sensitive in the sentence that are similar to sensitive key words (word clustering). In embodiment, computing device 103 executing computer program code, such as sensitive content identify 201 (in particular word cluster 201*b*) shown in FIG. 2, performs at least a portion of this function.

Figure 8:
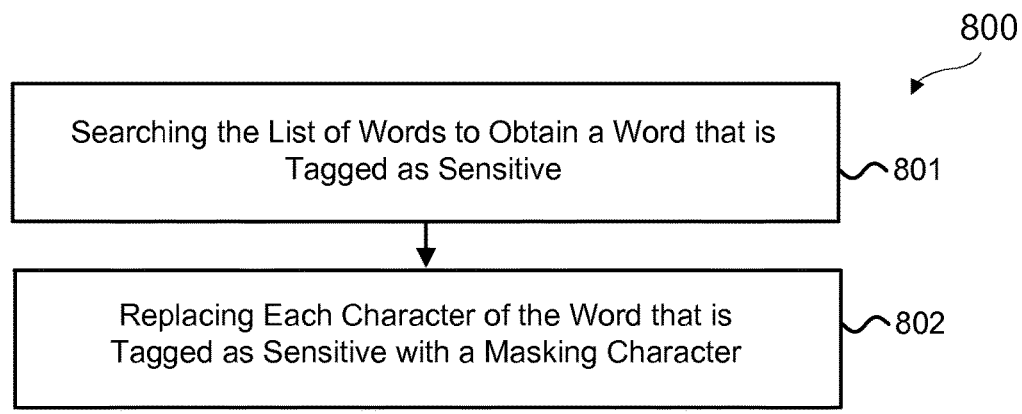

FIG. 8 is a flowchart illustrating a method 800 to mask sensitive information in an electronic document according to an embodiment.

Logic block 801 illustrates searching a list of words to obtain a word that is tagged as sensitive. In embodiment, computing device 103 executing computer program code, such as sensitive content mask 202 shown in FIG. 2, performs at least a portion of this function.

Logic block 802 illustrates replacing each character of the word that is tagged as sensitive with a masking character, such as a shaded rectangle or hashtag. In embodiment, computing device 103 executing computer program code, such as sensitive content mask 202 shown in FIG. 2, performs at least a portion of this function.

Figure 9:
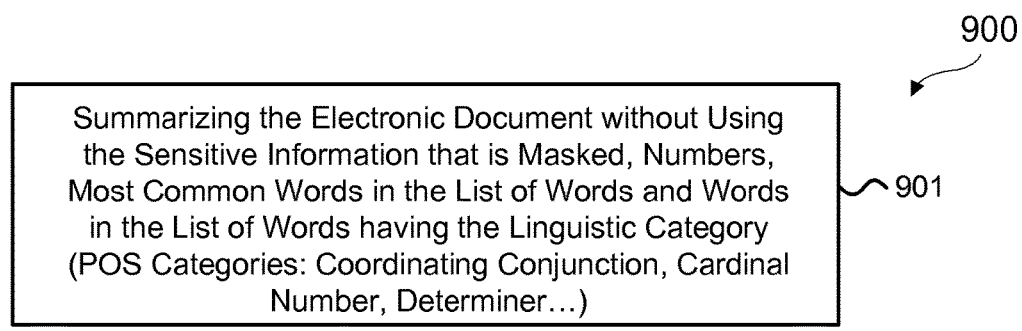

FIG. 9 is a flowchart illustrating a method 900 to summarize an electronic document without using sensitive information according to an embodiment. Logic block 901, in an embodiment, illustrates summarizing the electronic document without using the sensitive information or generating an insensitive summary of an encrypted electronic document. In an embodiment, masked information, numbers, most common words in the list of words and/or words in the list of words having are particular linguistic category are considered sensitive information in the electronic document and are not included in the insensitive summary. In an embodiment, particular linguistic categories include POS categories such as coordinating conjunction, cardinal number, determiner . . . . In embodiment, computing device 103 executing computer program code, such as summarize 203 shown in FIG. 2, performs at least a portion of this function.

The disclosed technology may be used with various computing systems or computing devices. FIG. 10 is a block diagram of an embodiment of a system environment 2200. Computing system environment 2200 includes a general purpose computing device in the form of a computer 2210. In embodiments, computing devices 101-106 shown in FIG. 1 may include one or more components of computer 2210. In embodiments, computing devices 105 and 106 may be a cellular telephone and tablet, respectively, with similar mobile components, such as touchscreens. In embodiments, computing devices 102 and 103 may include one or more servers having one or more components in computer 2210.

Components of computer 2210 may include, but are not limited to, a processing unit (or core(s)) 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media or processor readable memory. Computer readable media can be any available media that can be accessed by computer 2210 and includes both volatile and nonvolatile media, removable and non-removable media. By way of example, and not limitation, computer readable media may comprise computer readable storage media. Computer readable storage media includes both volatile and nonvolatile, removable and non-removable media implemented in any method or technology for storage of information such as computer readable instructions, data structures, program modules or other data. Computer readable storage media includes, but is not limited to, random access memory (RAM), read only memory (ROM), electrically erasable programmable read only memory (EEPROM), flash memory or other integrated circuit memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer readable storage media in the form of volatile and/or nonvolatile memory such as ROM 2231 and RAM 2232. A basic input/output system (BIOS) 2233, containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application program(s) 2235, other program module(s) 2236, and program data 2237. In an embodiment, computer program code as described herein may be at least partially stored in application program(s) 2235. In an embodiment, encrypted email and insensitive summary (application) 103a and integrated circuit processor 103b shown in FIG. 1 corresponds to application program(s) 2235 and processing unit 2220. In an embodiment, computing device 102 may be a email server having a email server application program corresponding to application program(s) 2235 and a corresponding integrated circuit processor corresponding to processing unit 2220.

The computer 2210 may also include other removable/non-removable, volatile/nonvolatile computer readable storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer readable storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through a non-removable memory interface such as interface 2240, and magnetic disk drive 2251 and optical disk drive 2255 are typically connected to the system bus 2221 by a removable memory interface, such as interface 2250.

The drives and their associated computer readable storage media described above provide storage of computer (processor) readable instructions, data structures, program modules and other data for the computer 2210. Hard disk drive 2241 is illustrated as storing operating system 2244, application program(s) 2245, other program module(s) 2246, and program data 2247. Note that these components can either be the same as or different from operating system 2234, application program(s) 2235, other program module(s) 2236, and program data 2237. Operating system 2244, application program(s) 2245, other program module(s) 2246, and program data 2247 are given different numbers here to illustrate that, at a minimum, they are different copies.

A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. In embodiments, computer 2210 includes input/output software and hardware to output and receive information from other computers on a network. For example, FIG. 10 illustrates a remote computer 2280 that may be a personal computer, a server, a router, a network PC, a peer device or other common network node, and typically includes many or all of the elements described above relative to the computer 2210. In an embodiment, one or more computing devices 101-106 shown in FIG. 1 correspond to remote computer 2280. In an embodiment, input/output software or program modules to transfer information on a network may be stored in network interface 2270 and/or modem 2272. In embodiments, other input/output software may be stored and executed in other components of computer 2210. The logical connections may include a LAN 2271 and a WAN 2273, but may also include other networks. Such networking environments are commonplace in offices, enterprise-wide computer networks, intranets and the Internet.

When used in a LAN networking environment, the computer 2210 is connected to the LAN 2271 through a network interface (or adapter) 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application program(s) 2285 may reside on memory device 2281. It will be appreciated that the network connections shown are exemplary and other means of establishing a communications link between the computers may be used.

The flowchart, sequence diagrams and block diagrams in the Figures illustrate the architecture, functionality, and operation of possible implementations of systems, methods and computer program products according to various aspects of the present disclosure. In this regard, each block in the flowchart or block diagram (or arrow in sequence diagram) may represent a module, segment, or portion of code, which comprises one or more executable instructions for implementing the specified logical function(s). It should also be noted that, in some alternative implementations, the functions noted in the block may occur out of the order noted in the Figures. For example, two blocks (or arrows) shown in succession may, in fact, be executed substantially concurrently, or the blocks (or arrows) may sometimes be executed in the reverse order, depending upon the functionality involved. It will also be noted that each block of the block diagrams or arrows and/or flowchart illustration, and combinations of blocks in the block diagrams or arrows and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
classifying, by a computing device, content information of an electronic document with at least a linguistic category;
identifying, by the computing device, sensitive information in the content information of the electronic document based on the linguistic category, the content information further including insensitive information;
masking, by the computing device, sensitive information in the electronic document based on the linguistic category to provide an electronic document having sensitive information that is masked by replacing each character of a word that is tagged as sensitive with a masking character;
generating, by the computing device, an insensitive textual summary of the content information in the electronic document, the textual summary comprising only insensitive information from the electronic document having the sensitive information that is masked;
encrypting, by the computing device, the electronic document to provide an encrypted electronic document; and
outputting, by the computing device, both the insensitive textual summary of the electronic document and the encrypted electronic document.

2. The method of claim 1, wherein the categorizing includes:
tokenizing information of the electronic document to obtain a list of words in a same order as presented in the electronic document; and
tagging each word in the list of words with a part of speech category as the linguistic category.

3. The method of claim 2, wherein the identifying includes:
determining when a sentence has sensitive information in the electronic document;
determining sensitive information in the sentence in the electronic document; and
tagging each word in the list of words as sensitive based on determining sensitive information.

4. The method of claim 3, wherein the masking includes:
searching the list of words to obtain a word that is tagged as sensitive.

5. The method of claim 4, wherein the summarizing includes:
summarizing the electronic document without using the sensitive information that is masked, numbers, most common words in the electronic document and words in the list of words having the linguistic category.

6. The method of claim 3, wherein determining the sentence having sensitive information comprises:
searching for a sensitive key word in the list of words;
identifying the sentence as sensitive when a word in the sentence matches the sensitive key word;
searching the list of words for a pattern; and
identifying the sentence as sensitive when at least a word in the sentence matches the pattern.

7. The method of claim 6, wherein the determining sensitive information comprises:
generating a plurality of trigrams for the sentence that has sensitive information;
tagging the plurality of trigrams with parts of speech categories; and
comparing a first part of speech category of a generated trigram in the plurality of trigrams with a second part of speech category of a word that has been tagged with the second part of speech category in the sentence that has sensitive information to determine whether to tag the word as sensitive.

8. The method of claim 7, further comprising:
tagging words as sensitive in the sentence that includes numbers, special characters and non-dictionary words;
tagging words as sensitive in the sentence that match a pattern;
tagging words as sensitive in the sentence that have a particular part of speech category;
tagging words as sensitive in the sentence that match a blacklisted word;
tagging words as sensitive in the sentence that are similar to a word identified as sensitive; and
tagging words as sensitive in the sentence that are similar to a sensitive key word.

9. The method of claim 1, wherein the electronic document is selected from the group consisting of an email, word processing file, spreadsheet and presentation, wherein the information includes a lexical item, and wherein the linguistic category is a part of speech category.

10. An apparatus comprising:
an integrated circuit processor; and
a non-transitory computer readable storage medium to store computer program code, the computer program code configures the integrated circuit processor to:
convert text in the body of an email into a plurality of tokens that represents a plurality of words;
tag a token in the plurality of tokens so that the token represents a part of speech category;
tag the token in the plurality of tokens so the token indicates a word represented by the token is sensitive;
mask the word in the text of the body of the email in response to the token that indicates the word represented by the token is sensitive by replacing each character of a word that is tagged as sensitive with a masking character;
generate an insensitive summary of the text of the body of the email, the insensitive summary including insensitive information from the text in the body that has had the word masked;
encrypt the text of the email into an encrypted email; and
output both the insensitive summary and encrypted email.

11. The apparatus of claim 10, wherein the token includes information stored in the computer readable storage medium, wherein the computer readable storage medium includes an integrated circuit memory, wherein the information includes a first portion to store information that represents the word, a second portion to store information that indicates a part of speech category of the word, and a third portion to store information that indicates whether the word is sensitive.

12. The apparatus of claim 11, wherein tag the token in the plurality of tokens so that the token represents the part of speech category includes the integrated circuit processor accessing the second portion to store information that indicates the part of speech category of the word.

13. The apparatus of claim 12, wherein tag the token in the plurality of tokens so the token indicates the word represented by the token is sensitive includes the integrated circuit processor accessing the third portion to store information that indicates the word represented by the token is sensitive.

14. The apparatus of claim 10, wherein the integrated circuit processor and computer readable storage medium are embodied in an encryption server coupled, by way of a network, to an email server that provides the email to the encryption server.

15. A non-transitory computer program product, comprising:
 a computer readable storage medium having computer program code embodied therewith, the computer program code comprising:
 computer program code configured to identify sensitive information in an email;
 computer program code configured to mask the sensitive information in the email by replacing each character of a word that is tagged as sensitive with a masking character, the email including insensitive information;
 computer program code configured to generate an insensitive summary of the email including only insensitive information from the email that has had sensitive information masked;
 computer program code configured to encrypt the email into an encrypted email; and
 computer program code configured to output both the insensitive summary of the email and the encrypted email.

16. The computer program product of claim 15, wherein the computer program code comprises:
 computer program code configured to tokenize text in the email into a plurality of tokens, each token represents at least a lexical item in the text,
 wherein the computer program code to tokenize includes computer program code to tag each token in the plurality of tokens with a part of speech category.

17. The computer program product of claim 16, wherein the computer program code configured to identify sensitive information in the email includes computer program code to search for sensitive key words.

18. The computer program product of claim 17, wherein the computer program code configured to identify sensitive information in the email includes computer program code to search for a regular expression pattern.

19. The computer program product of claim 18, wherein the computer program code configured to identify sensitive information in the email includes computer program code to search for words that are similar to sensitive key words and words that are identified as sensitive.

* * * * *